Feb. 8, 1938.                E. QUINN                 2,107,501
                         SHOEMAKING METHOD
            Filed Sept. 18, 1935        5 Sheets—Sheet 1
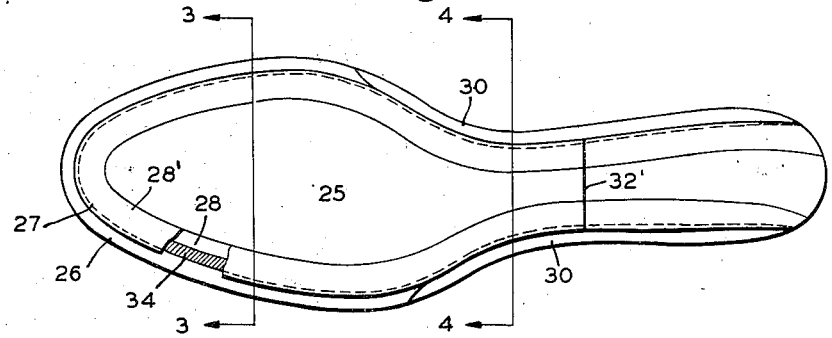
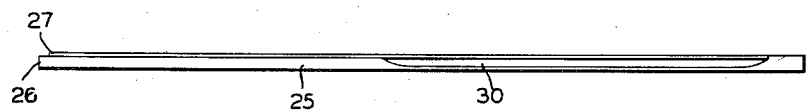
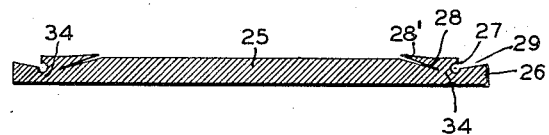
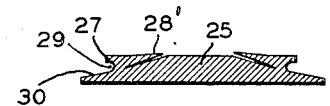
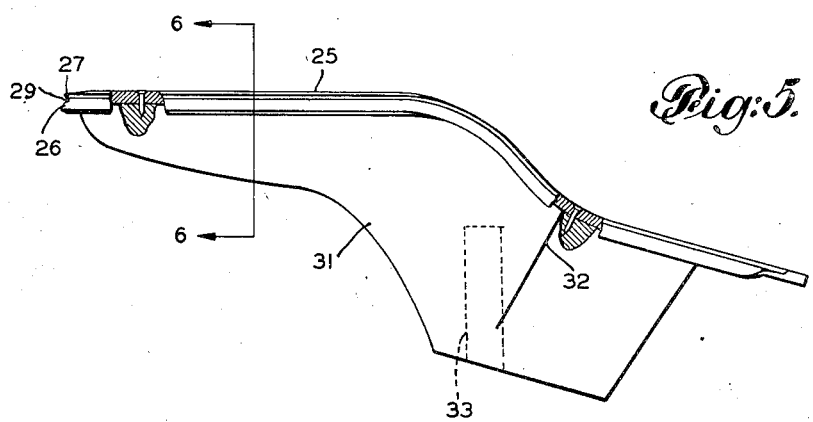
INVENTOR
*Edward Quinn*
BY
*Ashby & Ashby*
ATTORNEYS

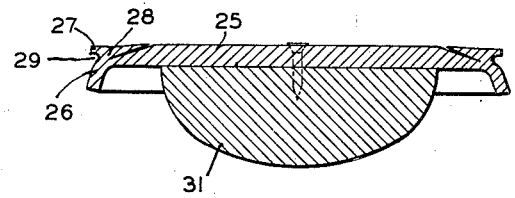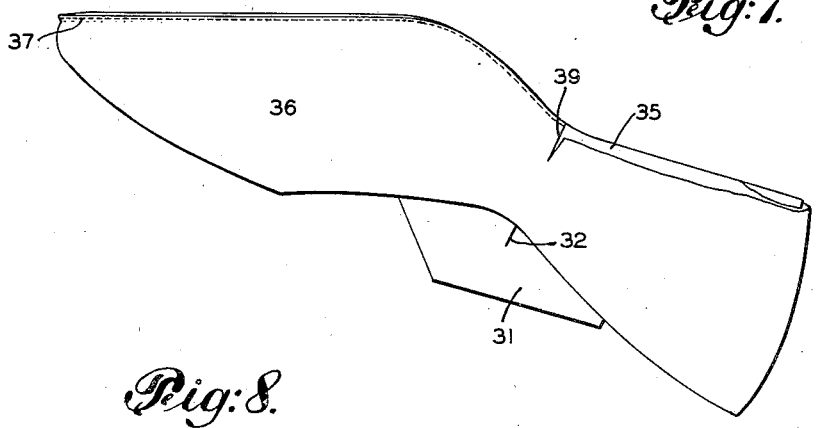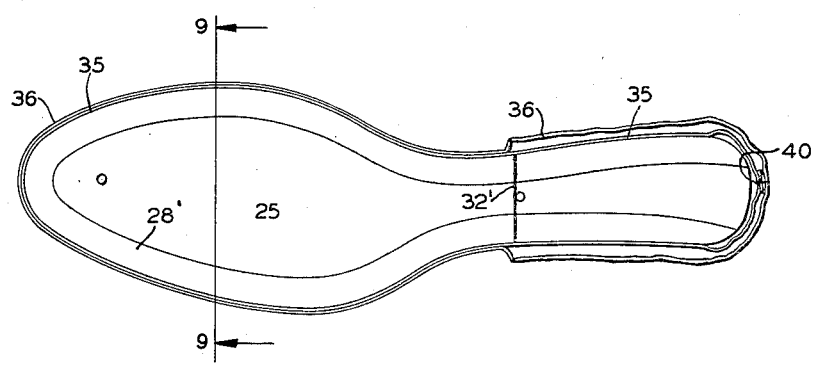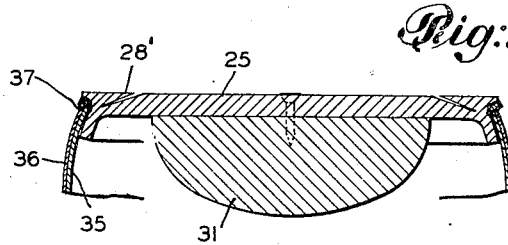

Feb. 8, 1938.  E. QUINN  2,107,501

SHOEMAKING METHOD

Filed Sept. 18, 1935   5 Sheets-Sheet 3

INVENTOR
Edward Quinn
BY
Ashley & Ashley
ATTORNEYS

Feb. 8, 1938. E. QUINN 2,107,501
SHOEMAKING METHOD
Filed Sept. 18, 1935 5 Sheets-Sheet 4
Fig:16.
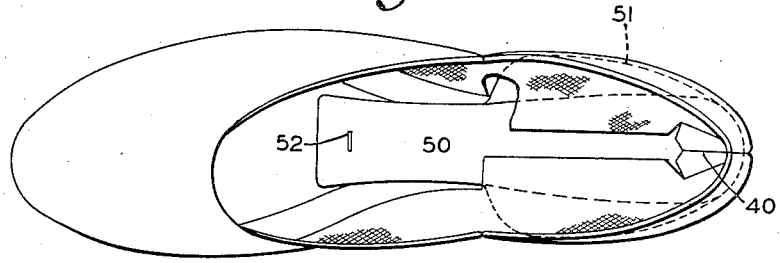
Fig:17.
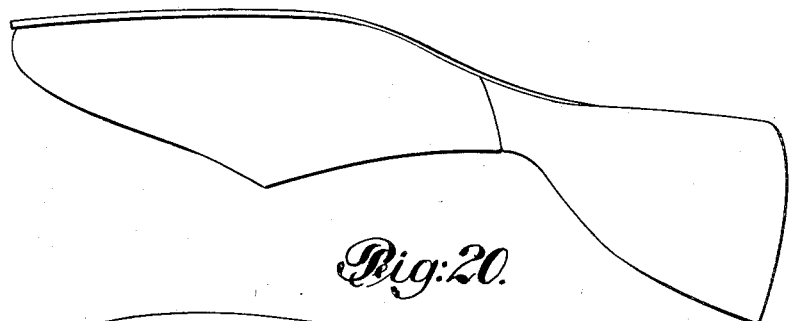
Fig:20.
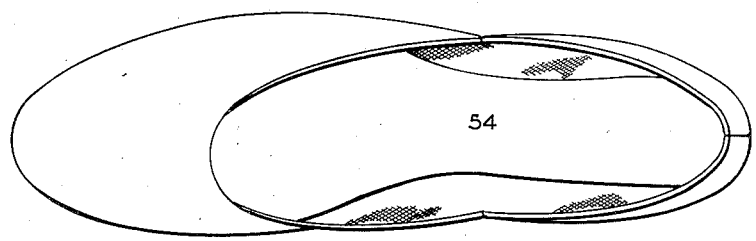
Fig:18
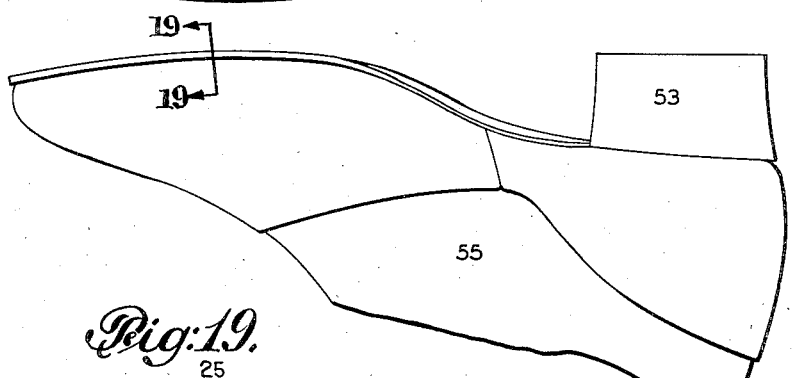
Fig:19.
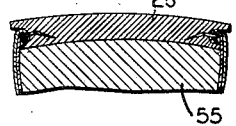
INVENTOR
Edward Quinn
BY
Ashley + Ashley
ATTORNEYS

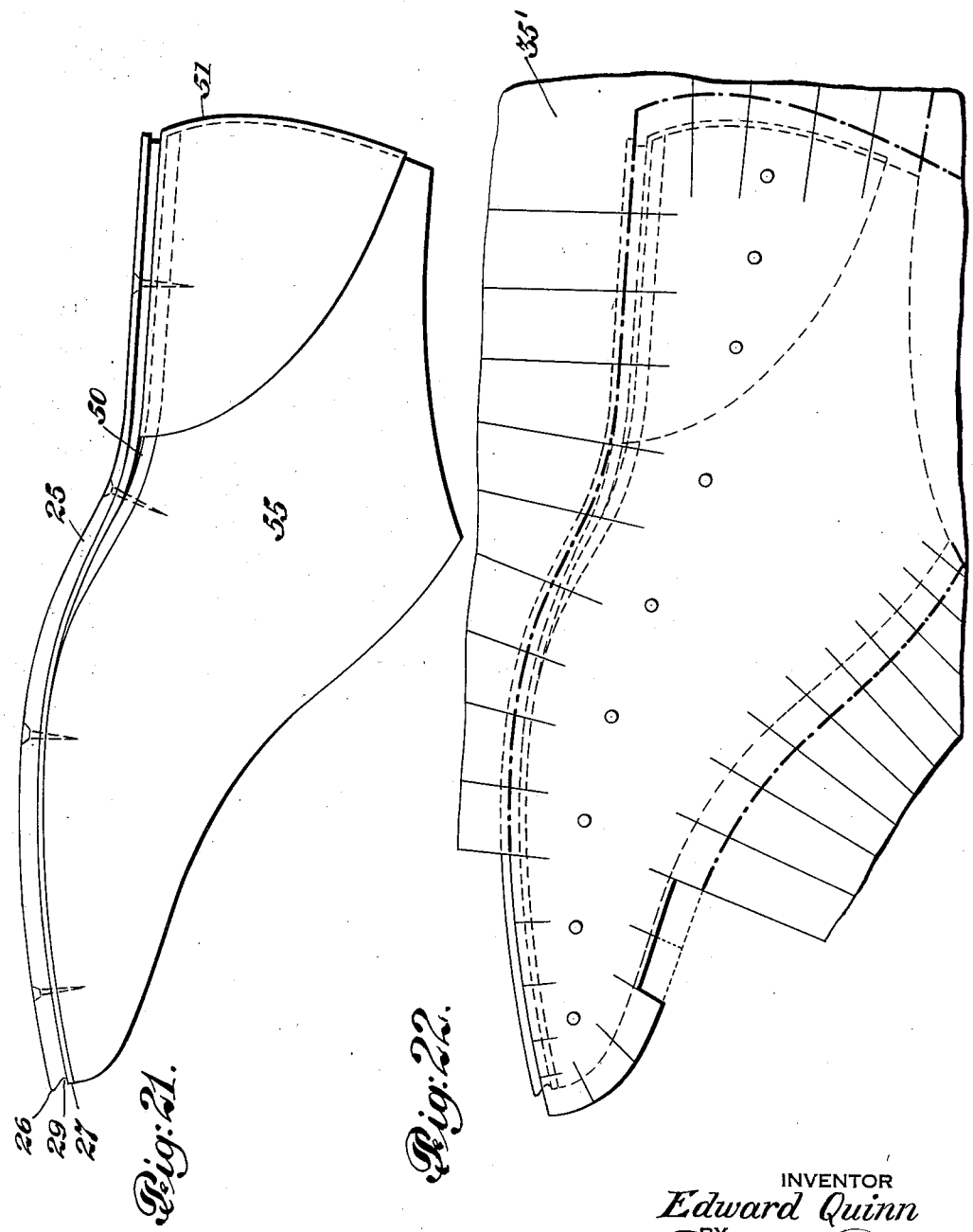

Patented Feb. 8, 1938

2,107,501

UNITED STATES PATENT OFFICE 2,107,501

SHOEMAKING METHOD

Edward Quinn, Brooklyn, N. Y., assignor to The Del-Mac Shoe Process Corporation, New York, N. Y.

Application September 18, 1935, Serial No. 41,082

12 Claims. (Cl. 12—142)

My invention relates to shoes and shoemaking and more particularly to shoes of the turn type having a single sole. The principal objects of my invention are, generally, to provide an improved method which will be economical of time and material and which will produce a smooth, neatly finished turn shoe with less effort, skill and equipment. Another object is to provide a turn shoe of improved construction. Many other and further objects will be pointed out with particularity in the following specification.

Referring to the drawings which form a part of this specification:

Figure 1 is a plan view of a rounded shoe sole which has been channelled similarly as soles are channelled for conventional turned shoes, and having its edges reduced rearwardly of the ball portion.

Figure 2 is a longitudinal edge view of the channelled and reduced sole shown in Figure 1.

Figure 3 is a sectional view taken on line 3—3 of Figure 1.

Figure 4 is a cross sectional view through the shank portion of the sole taken on line 4—4 of Figure 1.

Figure 5 is a side elevation of an assembly form to which the sole member has been temporarily attached, and illustrates the manner in which the edge portions of the sole are molded, in accordance with my improved method, to facilitate attachment of the upper.

Figure 6 is a cross sectional view taken on line 6—6 of Figure 5.

Figure 7 is a view similar to Figure 5 showing the upper and its lining adhesively secured to the molded edge portions of the sole member.

Figure 8 is a plan view of the partial assembly shown in Figure 7, and

Figure 9 is a cross sectional view taken on line 9—9 of Figure 8.

Figure 16 is a plan view of the shoe with the shank piece and counter assembled therein.

Figure 17 is a side elevation of the shoe as shown in Figure 16, showing the sole edge restored to its normal plane.

Figure 18 is a side elevation showing the shoe completely assembled on a last which is driven in after the parts are secured together, and also illustrates the appearance of the sole edge after it has been molded or rolled into conformity with the last to give the shoe its finished appearance.

Figure 19 is a cross sectional view taken on line 19—19 of Figure 18.

Figure 20 is a plan view of the shoe after removal of the last and insertion of the sock lining.

Figure 21 is a longitudinal elevational view of a last with a shank piece, counter and sole member tacked thereon in preparation for drafting the upper pattern, and Figure 22 is a view similar to Figure 21 and illustrates the manner in which the pattern is cut in relation to the sole edge.

Figure 10:
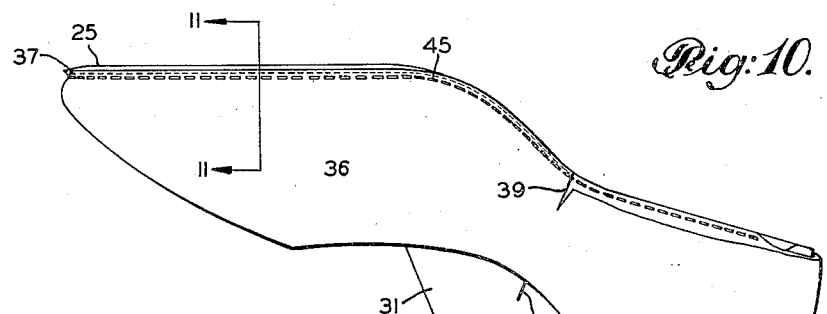
Figure 10 illustrates the upper permanently stitched to the sole and is a view similar to Figure 7.

My invention provides a method of making an improved turn shoe in which the sole and upper are assembled without the customary first last, the upper being accurately patterned and assembled to the sole so that it will fit and conform to the ultimate and only last used, said last corresponding to the second last usually employed in making turn shoes.

In carrying out my improved method, I first provide a rounded sole blank 25, channelled substantially in the manner common in producing turned shoes to provide a feather or flange 26 defined by a shoulder 27, and a channel 28 with its channel leaf or lip 28'. The rounded sole is larger than the bottom of last 55 by the breadth of the flanged areas 26 so that the shoulder 27 will correspond to the bottom edges of the last.

The channelling of the sole is preferably accomplished by means of a standard sole channelling machine. Such a machine is usually provided with an outside knife which forms a straight shoulder having a wall at right angles to the flange or feather 26, and in such cases I form the narrow groove or gutter 29 by a separate operation, the groove extending inwardly at the base of the shoulder wall. However, the outside knife of the channelling machine may be of modified construction to form the groove 29 at the juncture of the flange and the shoulder, as will be readily understood. After channelling, the flanged edge may be reduced rearwardly of the ball portion at 30 and this operation is the usual one performed by means of standard machinery suited for the purpose, commonly known as edge reducers or feather edgers.

When these operations have been accomplished, I further prepare the sole by molding the flange 26 at an angle to the sole and the portion of the shoulder above the groove 29 is molded angularly in the reverse direction, substantially into the position shown in Figure 5.

The pattern for the upper is then arrived at as follows: A suitable shank piece 50 and counter 51 are positioned on the last 55 and the shoulder channeled sole 25 is superimposed over the shank piece and counter with its channeled surface face toward the last bottom, as illustrated in Figure 21, thereby conforming the sole to the curvature it will be required to assume in the finished shoe. The shank piece, counter and sole are temporarily secured to the last by tacks, as shown.

A pattern or shell 35' is then drafted over the last in the usual manner except that the inseam edge of the pattern is carefully trimmed to conform to the shoulder edge of the sole, as illustrated in Figure 22, no surplus allowance being made. The dimensions for the upper being found, the usual upper cutting patterns are made in which proper allowances are provided for seaming the upper parts together but in which the inseam marginal edge is carefully maintained. An upper 35 is then cut in accordance with the pattern thus arrived at, said upper having no surplus, none being required nor permissible as no wasteful trimming operations are performed after the upper is attached to the sole. This accomplishes a saving in upper material of approximately one-fifth of a square foot per pair and permits attachment of the upper to the sole unsupported on a last, thereby eliminating the usual first lasting operations commonly performed in making turned shoes.

It will be understood that where a number of shoes of the same size and style are being made, it is not necessary to draft an upper pattern for each shoe but that one pattern will suffice for cutting the upper material for any number of shoes of the same size and kind. Also, I desire to point out that although it is necessary in making my improved shoe to pattern the upper carefully for size and seam allowance without surplus, my improvement in methods of drafting upper patterns is not confined to the making of shoes of the particular type here taught, its economies and advantages being obtainable in making shoes of other types and in accordance with other shoe-making methods.

A further advantage of my method of patterning uppers and of the novel pattern I employ is that a greater number of quality vamps may be cut from a skin without sacrificing portions of the skin which are not of vamp quality. One of the outstanding problems in the producing of uppers for slippers is the difficulty experienced in getting vamps of quality without sacrificing material due to the fact that the back part of a slipper, being of small area, does not consume that part of the skin which is not of vamp quality sufficiently fast to warrant the producing of good vamps. It will be noted that I have greatly reduced the amount of material required for making the vamp, thus permitting a greater number of vamps to be cut from that portion of the skin which is suited for vamps without any sacrifice of material.

The sole member is then removed from the last and temporarily tacked, channeled-side-out, to the face of an assembly form 31, in relation to which it is carefully positioned by bringing the guide mark 32 on the sole into correspondence with the gauge mark 32 carried on the form. The form 31 may be made of wood and its face is curved in a manner resembling the curvature of the last bottom. Unlike the last, however, the form is much smaller than the shoe and otherwise varies from the last in that its face is curved to compensate for the shank piece 50 and counter 51 subsequently to be inserted in the shoe. In other words, the face of the form corresponds in curvature to the under surface of the sole as it was when positioned over the shank piece and counter on the last when drafting the pattern for the upper, and as the sole will ultimately be curved in the finished shoe. A deep spindle hole 33 is provided in the form whereby it may be mounted on the usual shoe-maker's spindle.

The upper 35 and its lining 36 are secured together along the marginal inseam edge by suitable means, such as the plain stitching 37 over the forepart and forward shank portions prior to assembly with the sole. The lining is slightly smaller than the upper and, as shown, its back seam 40 may be taken in and closed as tightly as required to make the quarter lining fit as tightly as desired, so that when the shoe is turned after assembly the lining will fit properly and will not wrinkle or bulge. In other words, the upper material is loose within the lining to the degree that the lining is usually full inside the usual turned shoe after first lasting and turning. The lining is, however, left unsecured to the upper at the sole edge around the counter portion rearwardly of the slit 39 in the lining material where the assembly allowance of the lining is turned in against the wrong side of the upper material in the usual manner.

Since the upper is accurately patterned and the sole has been carefully positioned on the form, the material is ample for the vamp, toes, etc., without undue stretching or distortion of the throat and top line of the shoe.

It will be clear from the foregoing that the sole member is conformed on the block so that its margin substantially corresponds in curvature to the contour of the seam allowance or margin of the upper, thereby facilitating the following operations and insuring that the upper and sole margins will meet neatly without stretching or shirring of the upper materials.

The edge of the upper is now presented against the edge of the shoulder 27, or just below the shoulder edge, and is wiped into the groove 29 and secured to the flange or feather 26 and to the shoulder and the walls of the groove by any suitable means preparatory to stitching. Staples or fasteners may be used for this purpose but I prefer to adhesively secure the upper in position with rubber cement or latex 41. I have also successfully employed for this purpose a narrow strip of paper tape gummed on both sides which I have interposed between the upper and the flanged sole. By whatever means accomplished, the operation does not require high skill, particularly when compared to the expertness and strength required where shoes are assembled on lasts.

Where the upper material is of glazed leather, the marginal edges are abraded or roughed the better to receive the cement and this roughing is preferably accomplished before the plain stitching is performed to assemble the upper, lining, box toes or other stuffing or plumping used to reinforce or cushion the upper. A double row of stitches 37 may be employed, or the upper parts may be assembled together by means of binding tape to afford a rough surface for cementing where for any reason the abrading operation is inconvenient or undesirable.

Figure 11:
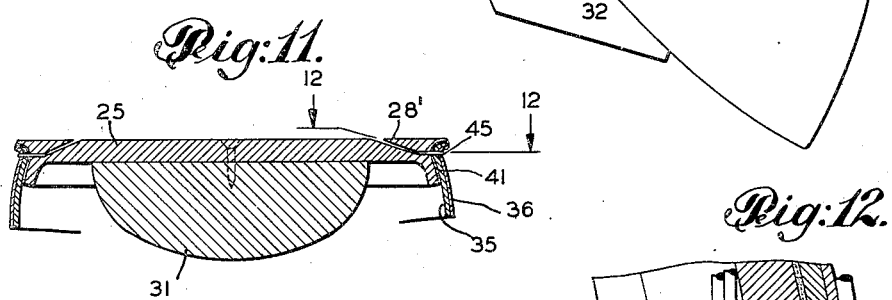
Figure 11 is a cross sectional view taken on line 11—11 of Figure 10.

After assembly the upper and the sole are more securely united by means of stitching 45 which extends through the upper parts and cement and through the between substance 34 of the sole lying intermediate the shoulder 27 or groove 29 and the channel 28, as shown in Figures 10 and 11. The sole may be removed from the assembly form before stitching if desired.

Figure 12:
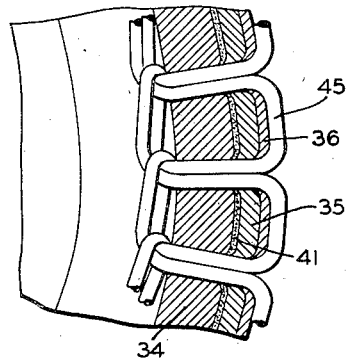
Figure 12 is a fragmental section taken on line 12—12 of Figure 11 and illustrates on an enlarged scale, the flat inside chain stitch which I prefer to employ in assembling the upper to the sole.
Figure 14:
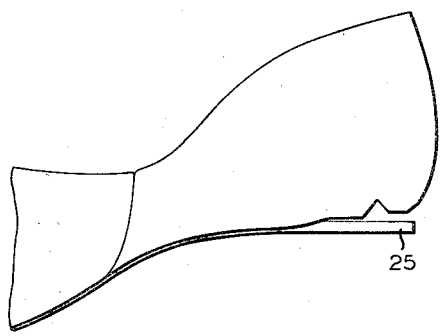
Figure 14 is a side elevation of the shank and heel portion of the shoe as shown in Figure 13.

The stitching 45 may be the usual hand stitching or machine stitch in which the chain lies on the outside of the seam. However, I prefer to employ a chain stitch as illustrated in Figure 12, the chain lying flat to form a strong and flexible seam under the channel leaf 28'. This stitching might be accomplished by hand but I have developed a novel straight needle sewing machine well adapted for the purpose which forms the subject matter of a further application for patent now in preparation.

Heretofore machine sewn turn shoes have been characterized by a seam, the chain portion of which comprises thread layers arranged vertically and forming a wall against the shoulder. This wall of thread, particularly when waxed, makes the turning of the shoe more difficult, lessens the flexibility of the sole and often gives discomfort to the wearer.

By whatever type of stitching the parts are permanently united, the operation is faciliated by the fact that the shoulder and channel are at all times in clear view of the operator and the parts are properly positioned and assembled so that the upper cannot creep during the stitching operation; also there are no mutilating tacks to be removed.

To further increase the flexibility of the shoe, the chain portion of the stitch may be left comparatively loose. The single thread, being the tightest part of any chain stitch, may be safely relied upon to pull the upper tight against the shoulder and hold it there, without undue tension or friction on the thread. This permits the use of comparatively light thread, increasing the flexibility of the seam and effecting an economy. This is the reverse of all seams formed by conventional shoulder turn stitching machines where the pulling force of the needle on the single thread part of the stitch operates to pull the sole and between substance 34 toward the upper. In light soled shoes and slippers the conventional machine stitch often results in a tendency for the sole to curl up at the toe and edge portions, because the greater stitching tension is such as will tend to draw the stitch receiving portions of the sole together, thereby buckling the margins of the sole and causing them to curl. This is a defect obviated by my improved seam construction in which the thread tension is comparatively small and the direction of strain is reversed.

Further to maintain the flexibility of the shoe materials, I prefer not to employ thread wax, either hot or cold, and in lieu of the usual soap composition thread lubricants I use rubber cement or latex which obtains the advantages of both the wax and the lubricant without incurring any of their disadvantages. The rubber cement serves excellently as a lubricant and, when it sets, it holds the thread securely in position; being elastic, it does not detract from the flexibility of the seam and its superior waterproofing qualities are well recognized.

Although I have described that the upper is affixed to the sole edge by staples, fasteners or cement 41 before stitching, I desire to have it understood that the upper may be assembled with the sole by the stitching 45 only, and that it is not essential to my method, broadly considered, that the upper parts be previously secured together. Such modifications are within the scope of my invention as hereafter claimed.

Figure 13:
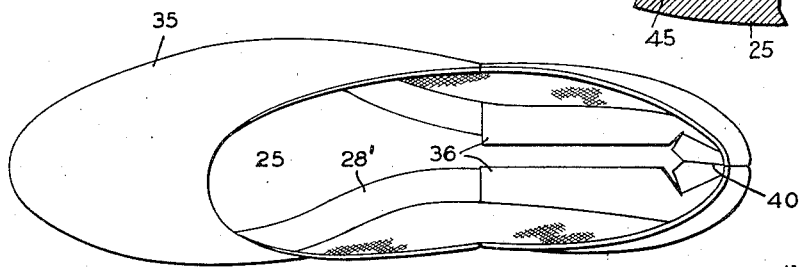
Figure 13 is a plan view of the shoe after the assembly form has been removed and the shoe has been turned, the upper lining being unsecured to the sole at the quarter sections and the upper being unsecured to the sole back of the heel breast line.

After stitching, the shoe is turned in the usual manner, the assembly form being first removed. The turning operation is facilitated by the flexibility of the seam and, on inversion, the lining rearwardy of the slit 39 is lifted and a shank piece 50 and counter 51 are inserted in the shoe and secured in position, as by means of a staple 52, whereafter the lining is dropped back and its marginal portions rearward of the slit 39 are turned in to face the inner surface of the sole, as shown in Figure 13.

The last 55 is driven in as in the usual second lasting performed in making conventional turn shoes and its insertion is faciliated by reason of the fact that the seam lies flat and there is a correct amount of upper material over the last at all points. After insertion of the last there is very little ironing to be done and it is never necessary to turn back the edge of the sole to beat up and iron the seam line, an operation which frequently mutilates and weakens the inseam thread in ordinary turn shoes because the edges of the beater-up iron and the hot iron are pressed against the thread. The lasting operation is further facilitated because the lining is assembled to smoothly and snugly fit and will not wrinkle up to impede the last.

Figure 15:
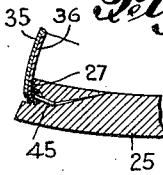
Figure 15 is a fragmental section of an edge portion of the shoe after the sole edge has been restored to its normal plane, and illustrates the finished relationship of the parts at the seam.

As best shown in Figure 15, the shoulder 27 is substantially in register with the edge of the last and serves to retain the upper in place as does the insole in a welt or McKay shoe, whereas in the usual turn shoe the shoulder is located well inside the last edge and the shoulder portion of the seam forms a ridge under the foot of the wearer which frequently causes discomfort.

In the course of the turning and lasting operations the flange or feather 26 and the shoulder 27 are caused to resume their normal planes. The sole is conformed to the last bottom in the usual manner as shown in Figures 18 and 19, and the usual trimming, setting and finishing operations are performed. The last is then removed and, either before or after delasting the heel 53 is assembled and, finally, a sock lining 54 may be inserted.

The sole may be wet or in temper, if desired, but I prefer to assemble the shoe in its normal dry condition, particularly in producing low priced shoes or slippers because the trimming setting and finishing operations may be performed immediately after lasting. That the method may be practiced with dry materials is of advantage where delicate upper materials are employed which would be stained or tarnished by tempering fluids or moisture.

Practice of the foregoing method results in a shoe which is highly flexible, interiorly smooth, and unmutilated by tack holes. The lining fits smoothly and snugly and there is no shirring of the upper parts under the foot at the shank portion as in conventional turn shoe constructions. The shoulder wall abuts flush against the lining and, the single threaded portion of the inseam being recessed in the groove inwardly of the shoulder edge, is prevented from creeping upwardly over the shoulder to form a ridge within the shoe, thereby insuring the shape holding qualities of the shoe at the bottom line thereof. The double threaded chain portion of the stitch lies flat under the protection of the channel leaf 28' and a break in the single thread, should it occur, is not serious, resulting only in the insecurity of one stitch.

Having thus described my invention, I claim:

1. In shoemaking methods, providing a rounded sole having a marginal feather defined by a shoulder, a lip channel inwardly of and parallel with said shoulder, and a groove extending inwardly at the base of said shoulder; adhesively securing the edge margin of an upper against the walls of said groove, and sewing the upper to the sole by means of stitching extending through the upper and the between substance of the sole lying intermediate the walls of said groove and said channel.

2. In shoemaking methods, that improvement which includes providing a rounded sole having a marginal feather defined by a shoulder, a lip channel inwardly of and parallel with said shoulder, and a groove extending inwardly at the base of said shoulder; providing an upper accurately proportioned for size and seam allowance without surplus; presenting the inseam edge of said upper against the shoulder; adhesively securing the edge margin of the upper to the walls of said groove; and stitching the upper to the sole through the between substance lying intermediate the walls of said groove and said channel.

3. In methods of making turned shoes, that improvement which includes providing a rounded sole having a marginal feather defined by a shoulder, a lip channel inwardly of and parallel with said shoulder, and a groove extending inwardly at the base of said shoulder; providing an upper accurately proportioned for size and seam allowance without surplus; presenting the inseam edge of said upper inside-out against the shoulder; adhesively securing the edge margin of the upper to the walls of said groove; turning the shoe; and inserting a last.

4. In methods of making shouldered sole turned shoes, that improvement which includes providing a shoulder cut sole having a groove extending inwardly thereof at the base of the shoulder wall, the forepart area of the sole defined intermediate its shoulder edges representing the full inside bottom area of the desired shoe forepart; providing an upper accurately proportioned for size and seam allowance without surplus; temporarily securing the sole channeled-side-out against the face of an assembly form curved substantially as the sole will be curved in the finished shoe; extending the inseam margin of the upper inside-out into the groove and adhesively securing it therein, coating seam thread with an elastic adhesive in fluid condition, sewing the upper to the sole with said thread by chainstitching, the single thread of the chain-stitched seam thus formed lying within the groove and the double thread comprising the chain portion of the seam being laid flat and untwisted within the channel, turning the shoe right-side-out, assembling a counter and shank piece in the shoe, and then inserting a last and conforming the shoe to its finished shape thereon.

5. In methods of making shouldered sole turn shoes, that improvement which includes providing a shouldered and channeled sole, providing an upper accurately proportioned for size and seam allowance without surplus, conforming the sole to a curvature corresponding substantially to the contour of the upper margin, securing the margin of the upper inside-out to the margin of the sole while unsupported on a last and while the sole is thus conformed, turning the shoe, and then inserting a last.

6. In methods of making shouldered sole turn shoes, that improvement which includes providing a shouldered and channeled sole, providing an upper accurately proportioned for size and needful seam allowance but without surplus, temporarily conforming the sole channeled-side-out against the face of an assembly form curved to present the margin of the sole in substantial correspondence with the contour of said upper margin, securing the margin of the upper inside-out to the margin of the sole while unsupported on a last and while the sole is thus conformed, turning the shoe, and then inserting a last.

7. In methods of making shouldered sole turn shoes, that improvement which includes providing a shouldered and channeled sole, providing an upper accurately proportioned for size and needful seam allowance but without surplus, temporarily conforming the sole channeled-side-out against the face of an assembly form curved to present the margin of the sole in substantial correspondence with the contour of said upper margin, adhesively attaching the margin of the upper inside-out against the shoulder of the sole while unsupported on a last and while the sole is thus conformed, removing the shoe from the form, permanently attaching the upper to the sole by inseam stitching, turning the shoe, and then inserting a last.

8. In shoemaking methods, providing a rounded sole having a marginal feather defined by a shoulder, a lip channel inwardly of and parallel with said shoulder, and a groove extending inwardly at the base of said shoulder, providing an upper accurately proportioned for size and seam allowance without surplus, conforming the sole to a curvature such that its margin will correspond substantially to the contour of the edge margin of the upper, adhesively securing the edge margin of the upper against the walls of said groove while unsupported on a last and while the sole is thus conformed, and then sewing the upper to the sole by means of stitching extending thru the upper and the between substance of the sole lying intermediate the walls of said groove and said channel.

9. In methods of making shouldered sole turned shoes, that improvement which includes providing a shoulder cut sole having a groove extending inwardly thereof at the base of the shoulder wall, the forepart area of the sole defined intermediate its shoulder edges representing the full inside bottom area of the desired shoe forepart, providing an upper accurately proportioned for size and needful seam allowance but without surplus, conforming the sole to a curvature such that its margin will correspond substantially to the contour of the edge margin of the upper, extending the inseam margin of the upper inside-out into the groove and initially securing it therein while the sole is thus conformed, sewing the upper to the sole by chainstitching, the single thread of the chainstitched seam lying within the groove and the double thread comprising the chain portion of the seam being laid flat and untwisted within the channel, turning the shoe right-side-out, assembling a counter and shank piece in the shoe, and then inserting a last and conforming the shoe to its finished shape thereon.

10. In methods of making turn shoes, that improvement which comprises providing an upper having a lining slightly smaller than the upper and fastening the upper and lining together with their inseam edges coinciding, providing a channeled turn sole and conforming the sole to a curvature such that its margin will conform substantially to the contour of the edge margin of the upper, initially attaching the combined upper and lining to the margin of the sole while unsupported on a last and while the sole is thus conformed, then permanently securing the upper to the sole by stitching extending into the sole channel, turning the shoe, and introducing a last into the shoe, thereby producing a turn shoe in which the upper and lining are of proper size to fit the last without wrinkling.

11. In shoemaking methods, providing a rounded and channeled turn sole, providing an upper accurately proportioned for size and seam allowance without surplus, conforming the sole to a curvature such that its margin will correspond substantially to the contour of the edge margin of the upper, initially securing the edge margin of the upper inside-out to the channeled margin of the sole while unsupported on a last and while the sole is thus conformed, then permanently securing the upper to the sole by means of stitching extending into said channel, turning the shoe, and then inserting a last.

12. In shoemaking methods, providing a rounded and channeled sole member, providing an upper accurately proportioned for size and seam allowance without surplus, conforming the sole member to a curvature such that its margin will correspond substantially to the contour of the edge margin of the upper, initially securing the edge margin of the upper to the channeled margin of the sole member while unsupported on a last and while the sole member is thus conformed, then permanently securing the upper to the sole member by means of stitching extending into the channel of the sole member, and subsequently inserting a last and conforming the shoe to its finished shape thereon.

EDWARD QUINN.